166-273
9/8/81    OR    4,287,950

United States Patent [19]
Baker et al.

[11] 4,287,950
[45] Sep. 8, 1981

[54] GAS PRE-INJECTION FOR CHEMICALLY ENHANCED OIL RECOVERY

[75] Inventors: Edward G. Baker, Berkeley Heights; John S. Huang, East Brunswick, both of N.J.

[73] Assignee: Exxon Research & Engineering Co., Florham Park, N.J.

[21] Appl. No.: 136,937

[22] Filed: Apr. 3, 1980

[51] Int. Cl.³ .................. E21B 43/22; E21B 33/13
[52] U.S. Cl. ........................... 166/273; 166/292
[58] Field of Search ............ 166/273, 274, 292, 305 R

[56] References Cited

U.S. PATENT DOCUMENTS

| 2,053,285 | 9/1936 | Grebe | 166/305 R |
|---|---|---|---|
| 3,244,228 | 4/1966 | Parrish | 166/273 |
| 3,386,506 | 6/1968 | Quance | 166/273 |
| 3,464,491 | 9/1969 | Froning | 166/273 X |
| 3,548,940 | 12/1970 | Reguera et al. | 166/273 |
| 3,586,107 | 6/1971 | Parrish | 166/273 |
| 3,599,716 | 8/1971 | Thompson | 166/273 |
| 3,599,717 | 8/1971 | McMillen | 166/273 |
| 3,653,440 | 4/1972 | Reisberg | 166/273 |
| 3,794,114 | 2/1974 | Brandon | 166/274 X |
| 3,893,511 | 7/1975 | Root | 166/274 X |

*Primary Examiner*—Stephen J. Novosad
*Assistant Examiner*—George A. Suchfield
*Attorney, Agent, or Firm*—James H. Takemoto

[57] ABSTRACT

A method for the chemically enhanced recovery of oil in which a gas is injected into the oil-bearing formation prior to the commencement of any surfactant flood. The pre-injection of gas allows the chemical flood to function more effectively and also permits the use of unthickened pushers and smaller surfactant banks.

10 Claims, 7 Drawing Figures

GAS PRE-INJECTION FOR CHEMICALLY ENHANCED OIL RECOVERY

BACKGROUND OF THE INVENTION

1. Field of the Invention

This invention relates to a process for the enhanced recovery of oil and more specifically, to a chemically enhanced process for recovering oil in which a gas is injected into an oil bearing formation prior to the injection of the displacement fluid.

2. Description of the Prior Art

The use of gas injection in conjunction with conventional secondary recovery methods such as waterflooding is known. For example, U.S. Pat. No. 3,525,395 describes a process in which the field is subjected to cycles of gas pressurization, production, waterflooding and production until oil recovery becomes uneconomical. The gas injection is intended to restore reservoir pressure and drive oil to the production system. U.S. Pat. No. 3,599,717 describes the formation of a free-gas phase followed by a gas/waterflood which process may take place in cycles.

Carbon dioxide is frequently the gas injected since it is miscible with petroleum, particularly relatively high viscosity petroleum. U.S. Pat. No. 3,586,107 discloses that when a reservoir is swept with carbon dioxide followed by a water drive, a portion of the carbon dioxide is trapped in pores reducing the amount of carbon dioxide available for oil displacement. This undesirable trapping of the miscible slug can be avoided by interposing a slug of inert gas between the carbon dioxide and waterflood.

U.S. Pat. No. 3,599,716 teaches an air slug followed by a slug of water containing a surfactant. The air results in oxidation of crude oil to form in-situ surface active components which are adsorbed on reservoir rock in place of the surfactants in the aqueous flood. U.S. Pat. No. 3,811,501 relates to the injection of carbon dioxide and an inert gas in order to form a miscible transition zone followed by a driving agent which may be water containing a surfactant. U.S. Pat. No. 3,893,511 employs alternating slugs of a gas and a foaming agent.

Finally, an improved tertiary oil recovery process is described in U.S. Pat. No. 3,882,940 wherein a gaseous slug is injected after subjecting the formation to a chemical tertiary recovery step such as a surfactant or micellar flood.

Because of the expense of surfactants and other additives such as thickening agents, the additional oil recovered as a result of chemically enhanced recovery techniques is usually insufficient to offset the added production costs. It would, therefore, be highly desirable to improve the efficiency of surfactant or micellar floods while at the same time being able to employ common surfactants even in hostile environments such as high brine concentration and eliminate the need for thickeners in pusher slugs.

SUMMARY OF THE INVENTION

It has been discovered that the effectiveness of chemically enhanced oil recovery in watered-out reservoirs can be substantially improved by injecting a gas into the formation prior to commencing chemically enhanced oil recovery. Accordingly, the present invention relates to a process for the enhanced recovery of oil from an oil-bearing formation which comprises injecting a gas into the formation in an amount sufficient to attain trapped gas phase saturation, injecting a fluid containing an effective amount of a surfactant to displace oil, driving the fluid through the formation and recovering the displaced oil.

Gases have been injected into oil-bearing formations for purposes such as restoring or maintaining formation pressure, displacement fluids and forming free-gas phases. Carbon dioxide alone or in combination with other gases has found use as a mobilizing aid in high viscosity oil fields. The present pre-injection of minor amounts of gases results in a trapped gas phase which is not displaced by any subsequent liquid floods. The amount of gas which will form a saturated trapped gas phase depends on the nature of the rock and varies from 3 to 30 pore volume %, preferably 10 to 20 pore volume %. Larger amounts may be employed, but gas substantially in excess of about 20 pore volume % is usually displaced by subsequently injected fluids.

The pre-injection of gas before a surfactant or micellar flood has surprisingly beneficial effects on flood performance. Among the factors improved are minimum surfactant slug size, greater residual oil recovery, earlier banking of oil and improved fractional oil flow. The use of a gas pre-injection step permits the injection of low-cost salt sensitive microemulsions directly into high brine reservoirs without fresh water purging and also permits the use of a polymer-free; i.e., unthickened, brine pusher. Moreover, no alternating gas-liquid cycles are required to achieve maximum oil displacement.

DETAILED DESCRIPTION OF THE INVENTION

Figure 1:
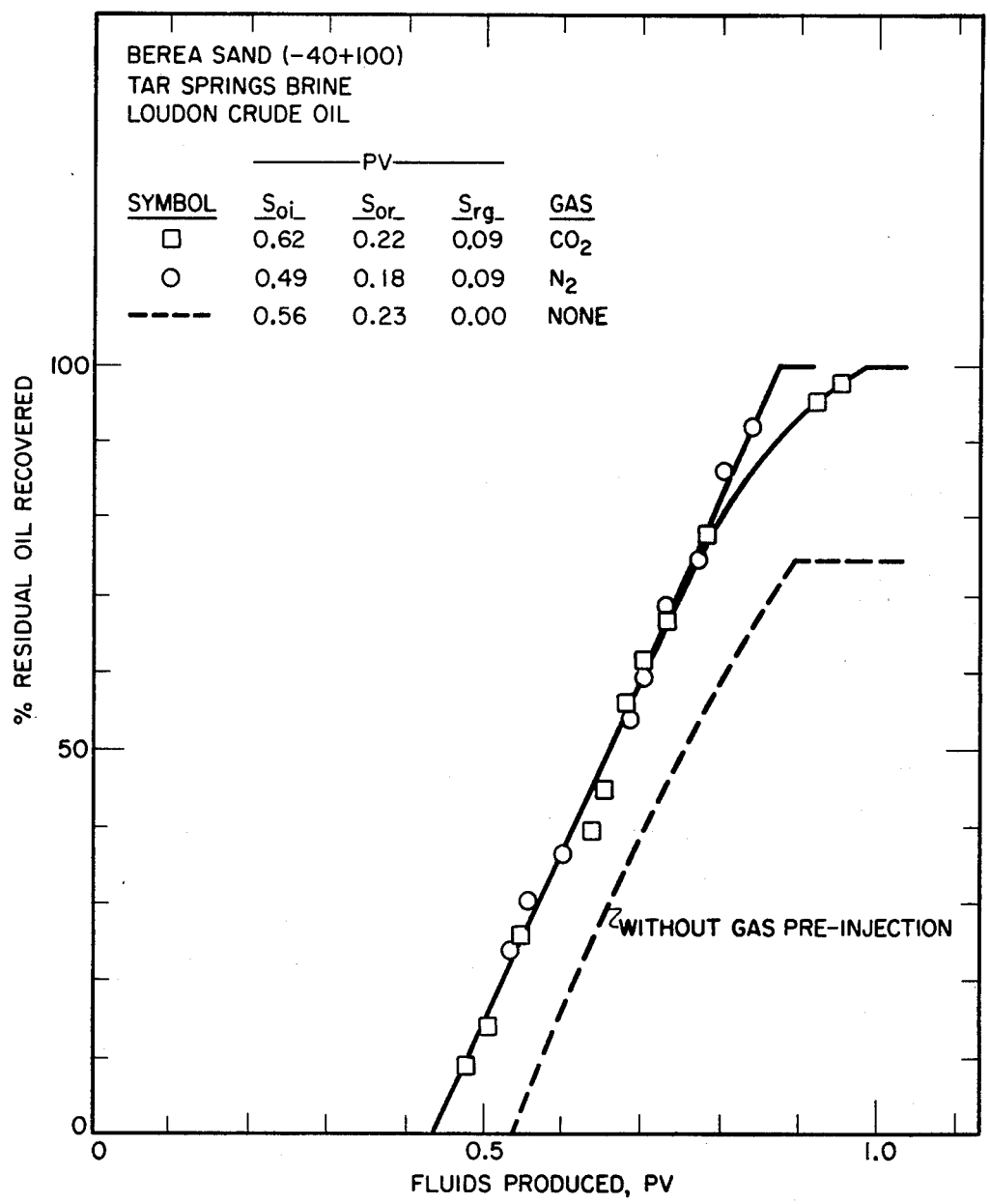
FIG. 1 is a graph of the effect of $CO_2$ and $N_2$ pre-injection on oil recovery from a Berea sandpack.

In watered-out reservoirs, the oil present is largely immobilized or trapped in the formation by capillary and wettability forces. In order to displace this trapped oil, surfactant floods, especially micellar floods, have been used. The injection of a gas into the formation prior to the surfactant flood substantially improves the performance of the latter. This gas is tightly held in the porous formation since it is not displaced by any subsequent flood under practical flow-rates. Any gas can in principle be used for pre-injection. Such gases are, e.g., air, nitrogen, ammonia, oxygen, carbon dioxide, carbon monoxide, sulfur dioxide, flue gas, exhaust gas, methane, ethane, propane, butane, liquified petroleum gas, natural gas and mixtures thereof.

The gases are preferably nitrogen, exhaust gas or flue gas, which are especially non-corrosive and non-combustible.

The surfactant floods are those known in the art which contain an effective amount of surfactant to displace oil. The surfactants are generally anionic, cationic, nonionic, amphoteric or mixtures thereof.

Anionic surfactants are carboxylates, sulfonates, sulfates and esters of phosphorus acid. Sulfonate and sulfate surfactants are preferred. Ethoxylated and/or propoxylated sulfonates and sulfates are especially preferred because of their increased ability to function at high brine and elevated temperatures.

Suitable cationic surfactants are amines, polyamines and quaternary ammonium salts. Preferred cationics are ethoxylated primary or secondary amines. Quaternary ammonium salts derived from the above cited primary or secondary amines are also preferred.

Nonionic surfactants are ethoxylated derivatives of phenols, amines, carboxylic acids, alcohols, and mercaptans as well as polyhydroxy compounds. Ethoxylated phenols and amines are preferred.

Amphoteric surfactants usually contain an amino group as the basic function and carboxylate or sulfonate group as the acidic function. These surfactants may also be ethoxylated. Preferred amphoterics contain a quaternary ammonium moiety and a sulfonate or carboxylate moiety.

Combinations of anionic surfactants with nonionic or cationic surfactants are preferred, especially combinations of sulfonates or sulfates with ethoxylated amines or ethoxylated quaternary ammonium salts.

The displacing fluid is preferably a micellar solution. A preferred form of micellar solution is that in which the surfactant is combined with oil and water or brine to form a microemulsion. Preferred microemulsions are water-external and derived from the surfactants set forth above.

The surfactant floods may optionally contain conventional additives such as co-surfactants or thickeners. These additives assist in functions such as formulation, brine or temperature tolerance and viscosity control. Examples of co-surfactants include alcohols, phenols, ethoxylated alcohols or phenols which may be sulfated or sulfonated and synthetic sulfonates. Typical thickeners are water soluble polymers such as polysaccharides, biopolymers, and partially hydrolyzed polyacrylamides, fatty acids soaps, alignates, sucrose and the like.

The techniques of surfactant flooding are well-known and are generally initiated after primary and waterflooding procedures have been completed. These methods usually involve a preflush to displace or remove materials which could interfere with the surfactant. A surfactant slug, a thickened pusher, and an unthickened drive water, are then sequentially injected.

In the present process, the preflush step is optional, even when salt-sensitive microemulsions are used. Whether or not a preflush is employed, a gas injection step is interposed immediately before the injection of the surfactant flood. The actual rate of injection is not critical. A rate of between 10 and 30 MMcf/day at a suitable pressure, e.g., $10^2$–$10^4$ psig is preferred in order to achieve maximum trapped gas phase saturation. The pressure should be maintained at a point below that at which fracturing could occur. Pressures in slight excess of the hydrostatic pressure are preferred; e.g., from 1.1 to 2.5 times the formation hydrostatic pressure.

The surfactant flood may be injected either continuously or in slug mode, and micellar floods are typically employed. The flood is conventionally driven through the field with a thickened pusher slug and may be followed by formation brine.

Surfactant flooding requires a thickened brine pusher in order to provide mobility control so as to avoid fingering effects at the pusher/surfactant flood interface. The process of the present invention differs in that the polymers usually added to provide mobility control may be omitted. This is a further beneficial result of the gas pre-injection step.

Because of the size of a typical oil field, in order to achieve a trapped gas phase over a significant fraction of the field, the use of multiple single completions over the entire formation thickness for gas injection is preferred. The gas is more preferably injected through dual completions with gas being injected through both intervals to facilitate an equalized gas saturation. Most preferably, gas may be injected initially in the lower interval simultaneously with an initial injection of water in the upper interval, followed by gas in both intervals.

One of the factors affecting the performance of gas pre-injection is the configuration of the field. The presence of permeable sands near the bottom of the payzone may facilitate gas input. Also a low effective ratio of vertical to horizontal permeability is desirable since this may control the rate at which gas migrates to the top of the sand as it travels from the injection site towards the production site. Finally, a close spacing of wells would be desirable.

It is presently thought that the injection of gas into watered-out reservoirs displaces water from pores and isolates an equivalent amount of pore space. In these depleted reservoirs, all of the oil remaining is largely immobilized, i.e., trapped by wettability and capillary forces. On the other hand, the water or brine which is present can be classified as either immobile or mobile. It is the mobile component of the formation water which is displaced by gas pre-injection, and the gas is effectively trapped as small bubbles by interfacial forces up to the point of trapped gas phase saturation.

When a chemical flood is injected, the surfactant lowers the interfacial tension of the immobilized oil permitting its movement. The trapped gas phase, however, is not affected and continues to isolate a portion of the total pore space available.

The breakthrough of oil occurs earlier by an amount roughly equivalent to the trapped phase saturation. While not wishing to be bound by any particular theory, it is possible that this trapped gas blocks the most water-wet channels and the flow of the flood is through the more oil-wet paths thus permitting increased fractional oil flow and greater recovery. Retrapping of oil may also be minimized. The use of a salt-sensitive microemulsion in a high brine field is possible in the instant process without a preflush. This is probably indicative of a reduced communication and co-mingling of the microemulsion with formation water.

One possible explanation of why an unthickened brine pusher slug can be used in the present process is that the usual tendency of aqueous pusher to move with greater ease in water-wet channels and override the slug of microemulsion in the preferentially oil-wet channels which contain the residual oil is greatly reduced. Thus the trapped gas phase may focus the flow of drive water through pores which transport microemulsion and residual oil.

The observed result is that gas pre-injection can increase the "effective" size of a surfactant slug by a much larger proportion than the pore volume isolated by trapped gas saturation. For any given surfactant slug, substantially more oil will be recovered with than without gas pre-injection which means that optimum oil recovery may be achieved using smaller slug sizes. This is expected to be especially important when dealing with relatively expensive surfactants. By focusing the flow of surfactant through selective oil-containing pores, the effective size (length) of the surfactant bank is increased. While erosion at the rear of the bank is expected to occur due to surfactant mixing with formation brine, the increased effective slug size will permit recovery of recoverable oil before collapse of the entire slug.

The gas pre-injection step and effects on oil recovery are further described by reference to the following examples.

EXAMPLES

Sample Preparation

The sand packs and cores used in the following examples were prepared according to the procedures outlined below:

A. Berea Sand Packs—crushed Berea sandstone was sieved (−40+100 mesh) three times, each for ten-minute intervals. A graduated 100 ml burette was prepared and a filter paper placed at the bottom. Seventy-five grams of sieved sand was continuously added while vibrating and rotating the vertically mounted burette. After capping the packed sand with filter paper, the weight and volume of the sand pack were measured. Following a $CO_2$ purge, the burette was flooded from the bottom with 40 ml of aqueous phase at 0.20 ml/min and after removing excess liquid, the pore volume can be determined from the weight and known density of the resident aqueous phase. In a similar manner, the burette was flooded with 35 ml of oil and the initial oil saturation ($S_{oi}$) determined. A second aqueous flood was then conducted, and the residual oil saturation ($S_{or}$) calculated by measuring the volume of oil displaced. After removing excess liquids, the sand pack is ready for tests.

B. Consolidated Berea Sandstone Cores—the core was purged with $CO_2$, weighed, and horizontally positioned on a lab jack. The core was flooded with aqueous phase at 10 ft/day and the pressure recorded after steady state flow has been achieved for permeability determination. The weight gain at saturation is then recorded and the core flooded with oil. The initial oil phase saturation can be calculated from the amount of aqueous phase displaced. A second aqueous flood is carried out until no further oil is displaced, and the volume of oil measured for calculation of the residual oil saturation. The relative permeability to the aqueous phase at residual oil saturation is then determined.

EXAMPLES 1-4

These examples demonstrate the effect of gas injection on oil recovery using a microemulsion as displacing fluid. The microemulsion employed to flood the sand pack contained 2 wt.% surfactant, 1 wt.% of a branched 20,000 M.wt. polyethylene oxide (PG20M manufactured by Union Carbide Corp.), 7 vol. % of n-decane and the balance Tar Springs Brine (TSB), which is a high brine aqueous solution containing 92.07 g/l NaCl, 7.89 g/l $CaCl_2$, 4.98 g/l $MgCl_2$, 0.113 g/l $BaCl_2 \cdot 2H_2O$, 0.195 g/l $NaHCO_3$. The surfactant designated $C_{18}$ TAS has the formula:

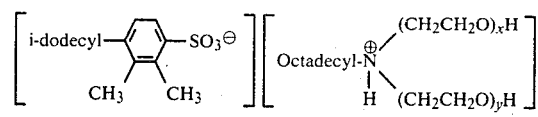

in which $x+y=7$ and 8, and the weight ratio of a blend of 7:8 ethoxylated surfactants is 20:28.

A watered-out sand pack or core prepared as set forth above is first injected with gas at a rate of about 2 cc/hr with an injection pressure of about 5 psi.

After gas bubbles emerge from the top of the sand pack or core, the volume of brine displaced is carefully noted. A measured volume of Tar Springs Brine is then re-injected and the amount of brine produced recorded. If the latter quantities are equal, then the volume of brine originally displaced by the injected gas is equal to the trapped gas saturation, $S_{rg}$. If less brine is produced than injected, the original volume of brine displaced is reduced accordingly to calculate $S_{rg}$.

The microemulsion is then injected at about 1-2 ft./day with the amount of fluid injected, the total fluid displaced, and the amount of oil produced being measured. The injection is usually terminated after 1 pore volume of total fluids have been produced. For comparative purposes, the microemulsion is injected without a gas injection step. The data are summarized in Table I.

TABLE 1

| Example | Test Substrate | Injection Gas | Microemulsion Surfactant/ Amount | PG20M[a] Oil/ Amount | Aqueous Phase | Rate Injection | PV $S_{oi}$ | $S_{or}$ | $S_{rg}$ |
|---|---|---|---|---|---|---|---|---|---|
| 1 | Sand Pack | $CO_2$ | $C_{18}$TAS/ 2 wt. % | 1 wt. % n-decane/ 7 vol. % | TSB[c] | 1 ft/day | 0.62 | 0.22 | 0.09 |
|  | Sand Pack | None | $C_{18}$TAS/ 2 wt. % | 1 wt. % n-decane/ 7 vol. % | TSB[c] | 1 ft/day | 0.56 | 0.23 | 0.00 |
| 2 | Sand Pack | $N_2$ | $C_{18}$TAS/ 2 wt. % | 1 wt. % n-decane/ 7 vol. % | TSB[c] | 2 ft/day | 0.49 | 0.18 | 0.09 |
|  | Sand Pack | None | $C_{18}$TAS/ 2 wt. % | 1 wt. % n-decane/ 7 vol. % | TSB[c] | 2 ft/day | 0.56 | 0.23 | 0.00 |
| 3 | Berea Sandstone Core | $N_2$ | $C_{18}$TAS/ 2 wt. % | 1 wt. % n-decane/ 7 vol. % | TSB[c] | 1 ft/day | 0.58 | 0.30 | 0.22 |
|  | Berea Sandstone Core | None | $C_{18}$TAS/ 2 wt. % | 1 wt. % n-decane/ 7 vol. % | TSB[c] | 1 ft/day | 0.62 | 0.33 | 0.00 |
| 4 | Berea | Air | $C_{18}$TAS/ | 1 wt. % n-decane/ | TSB[c] | 0.98 ft/day | 0.48 | 0.33 | 0.21[d] |

TABLE 1-continued

| Example | Test Substrate | Injection Gas | Microemulsion Surfactant/ Amount | PG20M[a] Oil/ Amount | Aqueous Phase | Rate Injection | PV $S_{oi}$ | $S_{or}$ | $S_{rg}$ |
|---|---|---|---|---|---|---|---|---|---|
| | Sandstone Core | | 2 wt. % | 7 vol. % | | | | | |
| | Berea Sandstone Core | None | $C_{18}$TAS/ 2 wt. % | 1 wt. % n-decane/ 7 vol. % | TSB[c] | 1.70 ft/day | 0.54 | 0.42 | 0.00[d] |

[a]Branched 20,000 M. Wt. polyethylene oxide.
[b]Ethoxylated octadecylammonium salt of i-dodecyl-o-xylene sulfonic acid.
[c]Tar Springs Brine
[d]The characteristic permeabilities with and without air pre-injection are 443 and 613 millidarcies, respectively.

FIG. 1 shows that with either a $CO_2$ or $N_2$ gas pre-injection (GPI) step, production of oil occurs earlier and is essentially complete by the time one pore volume of microemulsion is injected. In contrast, without gas injection, oil production is delayed and only about 75% of the residual oil is recovered as compared to a 100% recovery with gas pre-injection.

Figure 2:
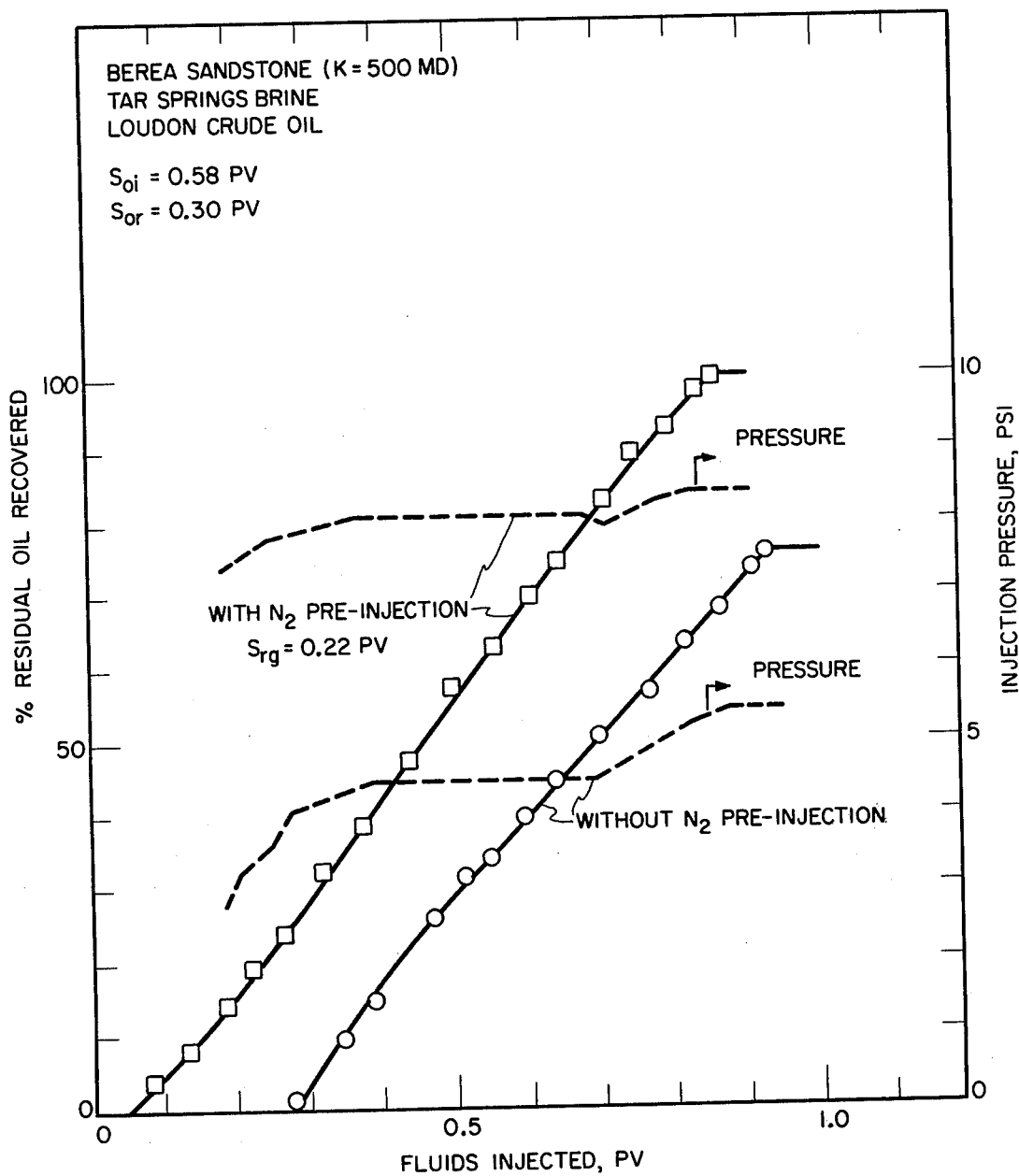
FIG. 2 is a graph of the effect of $N_2$ pre-injection on oil recovery from a Berea sandstone core.

In Example 3, a Berea sandstone core is substituted for a sand pack and as illustrated in FIG. 2, initial oil production commenced at 0.05 pore volume and oil recovery was essentially complete by the time 0.85 pore volume of microemulsion had been injected. Without $N_2$ pre-injection, oil was not produced until 0.27 pore volume and only about 76% of the residual oil was recovered at microemulsion breakthrough which occurs at 0.93 pore volume.

Also displayed in FIG. 2 are the injection pressures observed upon continuous introduction of microemulsion at the frontal velocity of 1 ft/day. (The injection pressure usually exceeds the pressure that would be sensed 1 inch downstream from the entry face by about 1.5 psi.) The higher pressure recorded for microemulsion flow following $N_2$ pre-injection is consistant with the decrease in permeability that would attend the isolation of pore space by the trapped gas phase.

Figure 3:
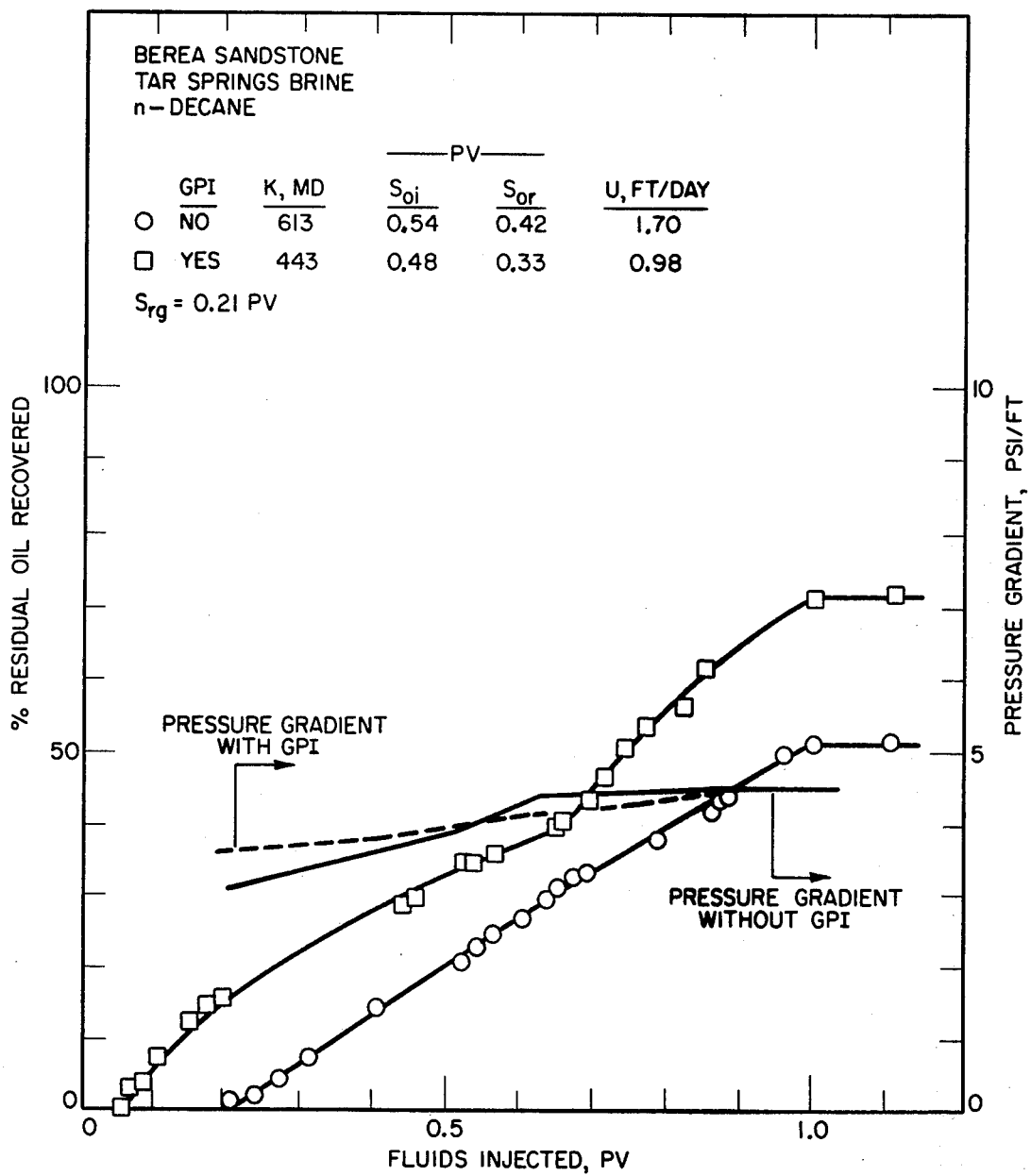
FIG. 3 is a graph of the effect of air pre-injection on oil recovery from a Berea sandstone core with equalized pressure gradients.

In Example 3, the higher oil recoveries achieved with gas pre-injection could conceivably be attributed to the increased pressure gradient which develops at constant flow rate. Example 4, therefore, matches the pressure gradients by adjusting flow rates. FIG. 3 demonstrates that with pressure gradients maintained at approximately the same values for both systems, the core with residual gas phase saturation shows a final oil recovery of 70% compared with a 51% recovery without gas pre-injection even though the former had a 56% lower frontal advance rate (0.98 vs. 1.70 ft/day). The improvement in oil recovery therefore is not due to pressure gradients.

EXAMPLE 5

This example illustrates the effect of gas pre-injection on a brine sensitive microemulsion in a high brine environment. The microemulsion was formulated from 2 wt.% of the monoethanolamine salt of i-dodecyl-o-xylene sulfonic acid (PDM-388), 1 wt.% tertiary amyl alcohol, 7 vol.% of synthetic Loudon crude and the balance 1.5 wt.% NaCl. Synthetic Loudon crude is a 90:10 blend of Isopar M and Heavy Aromatic Naphtha, which are trade names for paraffinic and aromatic oils, respectively, manufactured by Exxon Co.

The above microemulsion is known to perform well in a low salt environment, e.g., 1.5 wt.% NaCl, but poorly at high salt concentrations such as are found in Tar Springs Brine. The tests were conducted in Berea sand packs as described in Example 1. The $S_{oi}$ and $S_{or}$ parameters with and without air pre-injection (API) were 0.63, 0.21 and 0.65, 0.23, respectively. The residual gas phase saturation was found to be 0.08 pore volume.

Figure 4:
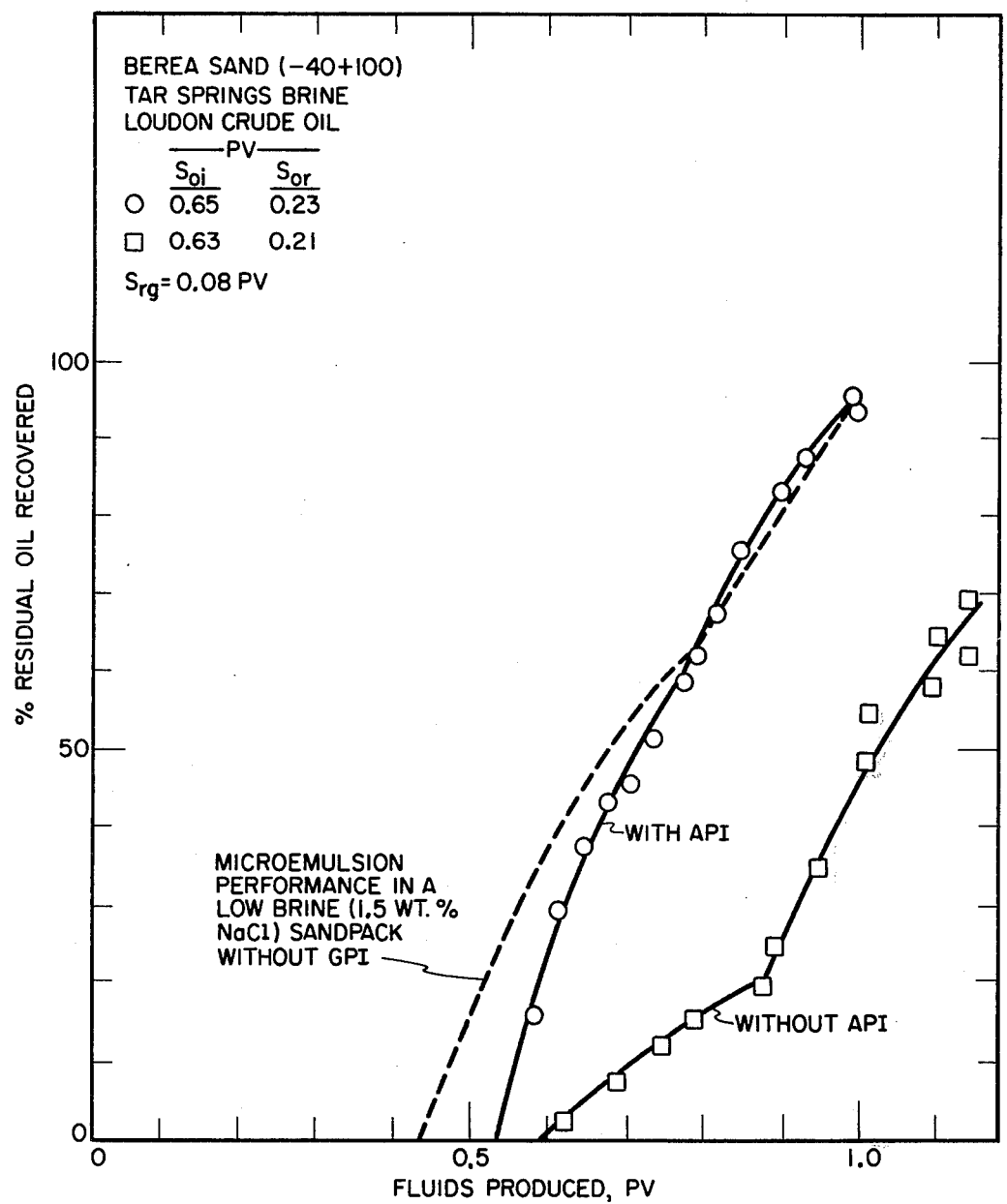
FIG. 4 is a graph of the effect of air pre-injection on oil recovery using a brine sensitive microemulsion in a high brine environment.

In FIG. 4, the dotted line shows microemulsion performance under ordinary ideal laboratory conditions; i.e., 1.5 wt.% NaCl (a compatible brine) without gas pre-injection. As can be seen from this figure, even under high brine conditions, this salt sensitive microemulsion performed almost as if it had been injected into a compatible, low salt environment. In contrast, without gas pre-injection (GPI), the results obtained are very poor.

EXAMPLE 6

This example further illustrates the effect of gas pre-injection on a brine-sensitive microemulsion in a high brine environment using Berea sandstone cores. The microemulsion was formulated from 2 wt.% monoethanolamine salt of iso-dodecylorthoxylene sulfonic acid, 7 vol.% n-decane, and the balance 1.6 wt.% NaCl.

The above microemulsion performs well in slug mode in a hostile environment, provided it is pushed with a low salinity, thickened drive solution. If the salinity of the drive solution is comparable to that of the hostile formation water, e.g., 84% Tar Springs Brine, much lower oil recovery results. However, if gas pre-injection is employed, the same hostile drive solution recovers twice as much oil.

Figure 5:
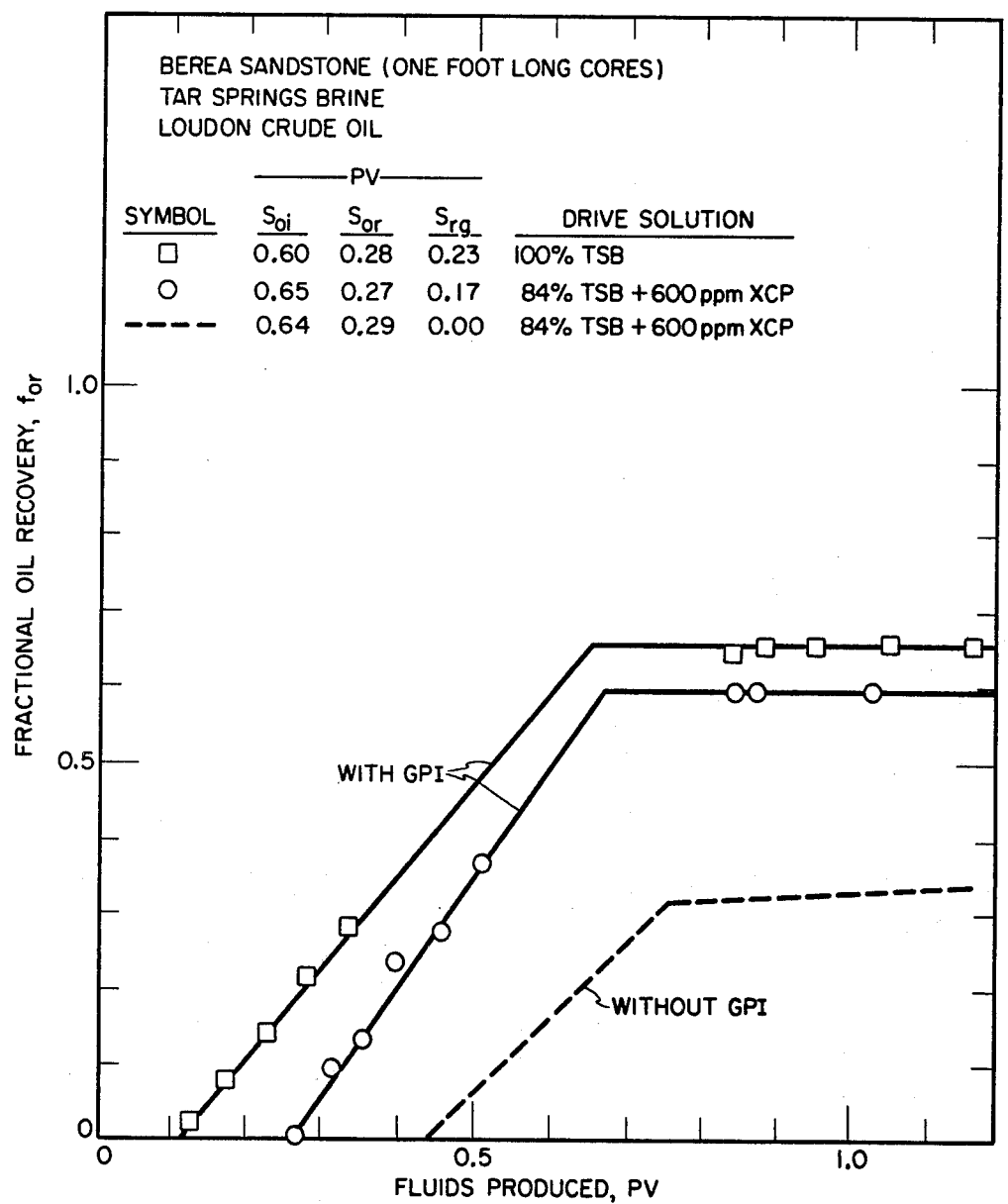
FIG. 5 is a graph of the effect of air pre-injection on oil recovery from a high brine Berea sandstone core using a salt-sensitive microemulsion and an unthickened or thickened, high brine pusher.

In FIG. 5, the dotted line shows that about 30 percent of the residual oil in the Berea sandstone core watered-out with Tar Springs Brine is recovered upon injection a 35 pore volume % salt-sensitive microemulsion slug directly into the hostile environment and driving with 84% Tar Springs Brine solution thickened with 600 ppm of xanthan biopolymer (XCP).

The experiment was repeated, only air pre-injection was used to establish a trapped gas phase saturation of 17 pore volume % before introduction of the microemulsion slug. As shown in FIG. 5, oil production commenced 0.17 PV earlier and 60% of the residual oil was recovered by the time 0.7 pore volume of fluids had been produced.

In a further experiment, air pre-injection was used to establish a trapped gas phase saturation of 23 pore volume percent before introduction of 0.35 PV of the salt-sensitive microemulsion. The microemulsion slug was driven with unthickened Tar Springs Brine and 65 percent of the residual oil was recovered, as much as if a thickened high brine drive solution had been employed in conjunction with air pre-injection, as described above. These results show that for a Berea sandstone core using gas pre-injection, a salt sensitive microemulsion slug can be injected directly into a hostile environment and driven with the unthickened, hostile formation brine. There is no need to add water soluble polymer to the drive water.

EXAMPLE 7

The pusher slug typically employed in enhanced oil recovery is a thickened brine so as to avoid fingering between the microemulsion and pusher. As previously shown in Example 6, above, the use of gas pre-injection permits driving the microemulsion with an unthickened slug, and this is further demonstrated in the following example using a low salinity pusher.

The microemulsion system was the same as that described in Example 5. In the Berea sand pack 1.5 wt.% NaCl replaced Tar Springs Brine as the resident aqueous phase. The $S_{oi}$ and $S_{or}$ values were approximately the same as those set forth in Example 5, i.e., 0.61, 0.23 and 0.65, 0.23, respectively, and the residual trapped gas phase ($S_{rg}$) with air pre-injection was only 0.03 pore volume. The microemulsion slug size was 21 pore volume % and this was driven by a slug of 1.5 wt.% NaCl which did not contain added polymer as thickening agent.

Figure 6:
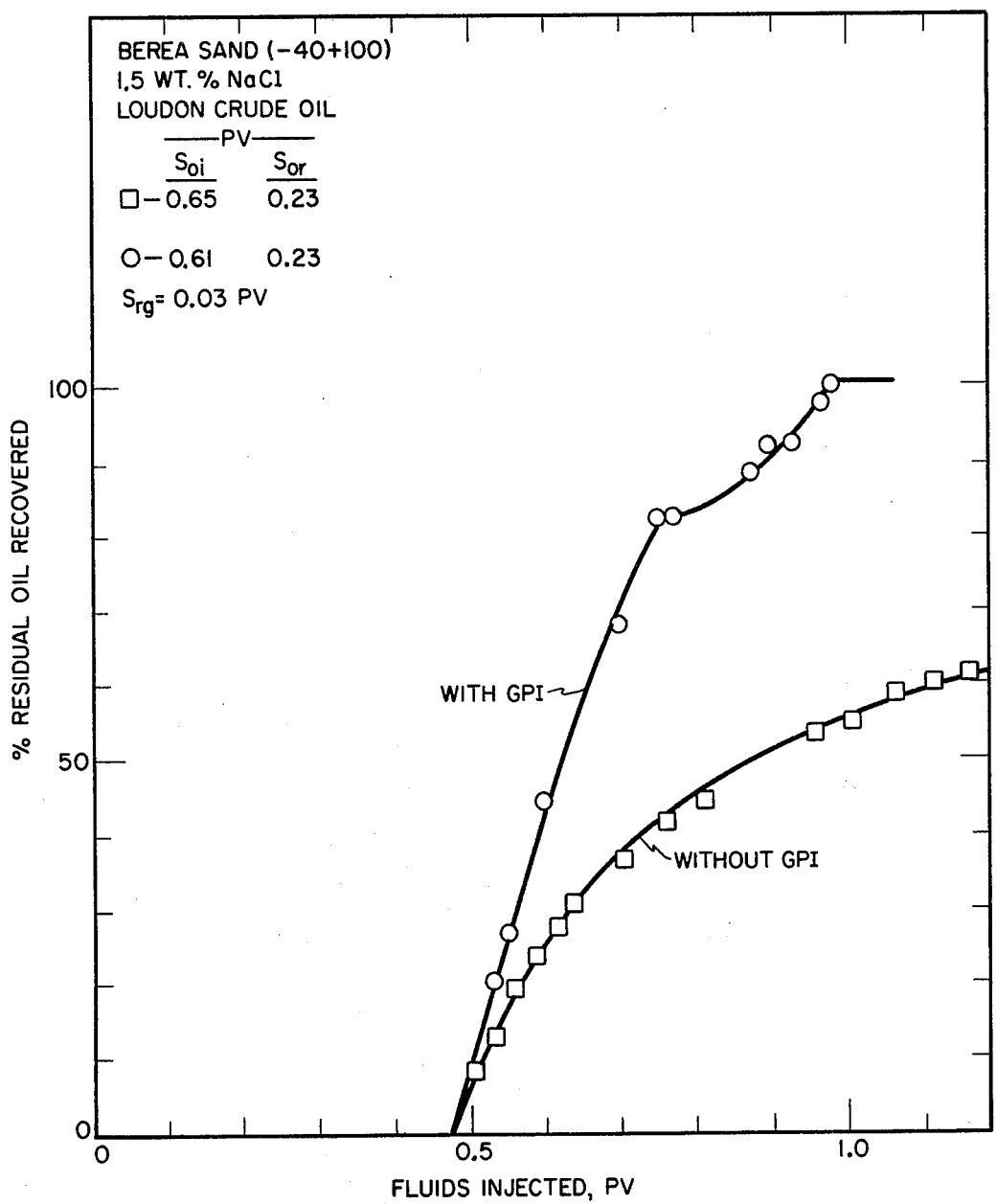
FIG. 6 is a graph of the effect of air pre-injection on oil recovery from a high brine Berea sandstone core using a brine sensitive microemulsion and an unthickened, 1.5% NaCl aqueous pusher.

FIG. 6 shows that an air pre-injection step substantially improves oil recovery for a given microemulsion slug while permitting the use of an unthickened pusher slug. The pre-injection step results in a final oil recovery of 100% at 0.98 pore volume whereas the same microemulsion and pusher without pre-injection produces only a 54% recovery at 1.00 pore volume.

EXAMPLE 8

Gas pre-injection permits the use of low cost salt-sensitive surfactants in high brine fields without a pre-flush step. Moreover, the size of the slug can be substantially reduced due to an increased effectiveness in surfactant displacement of recoverable oil.

Varying pore volumes of a microemulsion containing 2 wt.% of the monoethanolamine salt of i-dodecylorthoxylene sulfonic acid (PDM-388), which is an incompatible surfactant in a high brine environment, 7 vol.% n-decane and the remainder 1.2 wt.% aqueous NaCl are injected directly into a Berea sandstone core containing Tar Springs Brine. The surfactant slug is then driven through the core using a 100% TSB pusher. An air pre-injection step is then interposed prior to injecting 0.35 PV of the salt-sensitive surfactant slug to establish a trapped gas phase saturation ($S_{rg}$) of 0.21 PV.

Figure 7:
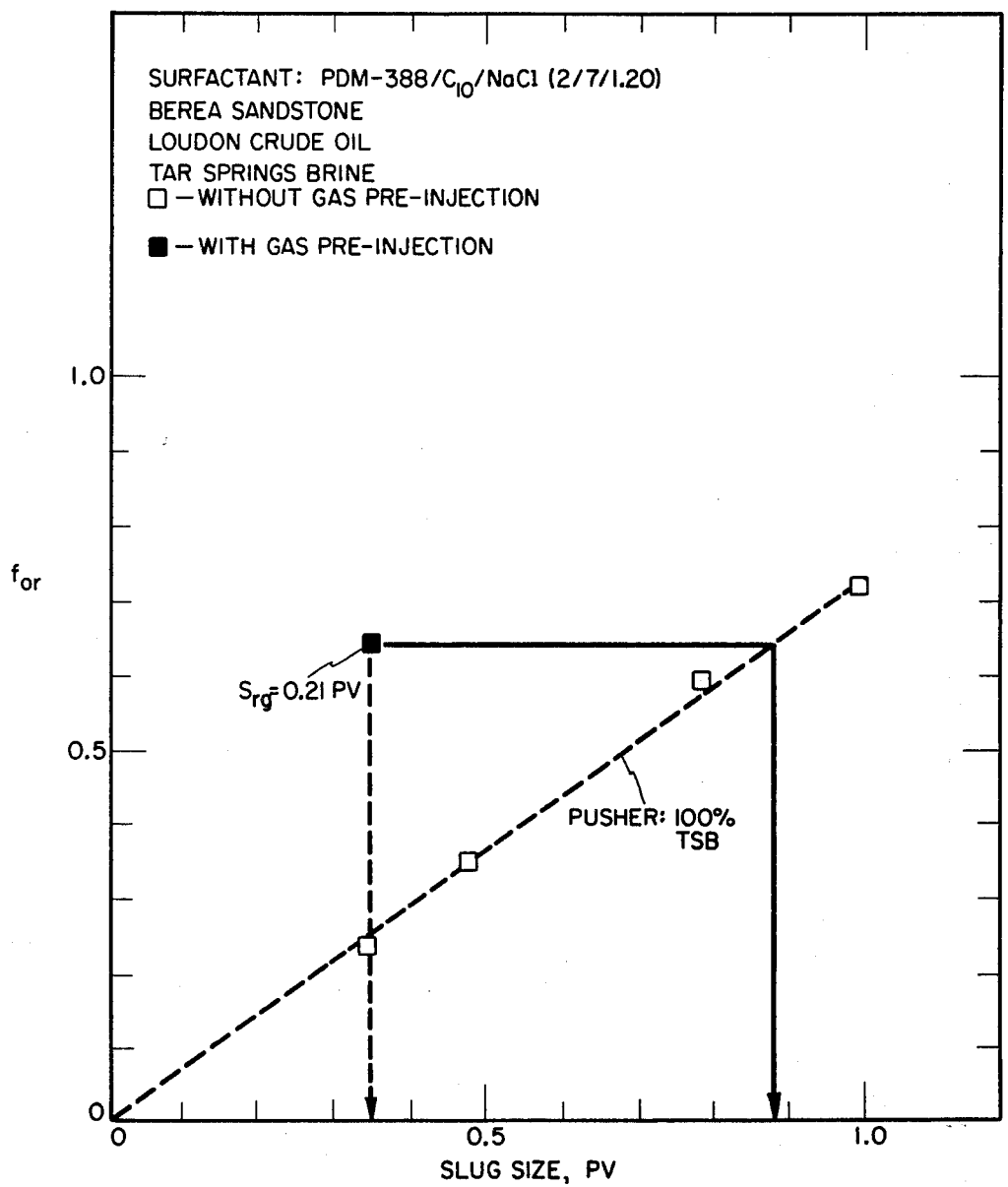
FIG. 7 is a graph of the effect of air pre-injection on fractional oil recovery from a high brine Berea sandstone core using a brine sensitive microemulsion.

The results are shown in FIG. 7, which is a graph of the effect of air pre-injection on the fractional oil recovery ($f_{or}$) versus surfactant slug size using a salt-sensitive surfactant in a hostile brine medium. As can be seen from the figure, when an 0.35 PV slug is injected directly into the core containing TSB, only 23% ($f_{or}=0.23$) of the residual oil available in the prepared core is recovered. Using an air pre-injection step, the same 0.35 PV slug recovered 64% of the available residual oil. By extrapolation, it can be determined that in order to achieve a 64% oil recovery without air pre-injection, an 0.88 PV slug would have been necessary. This represents a 150% increase in effective slug size even though the pore volume was reduced only 21% by the trapped air.

What is claimed is:

1. A process for the chemically enhanced recovery of oil from an oil-bearing formation which consists essentially of the steps of injecting nitrogen, flue gas or exhaust gas into the formation in an amount sufficient to attain trapped gas phase saturation, injecting a fluid containing an effective amount of surfactant to displace oil, driving the fluid through the formation with an aqueous pusher, and recovering the displaced oil.

2. The process of claim 1 wherein the amount of gas injected to attain trapped gas phase saturation is from 3 to 30 pore volume %.

3. The process of claim 1 wherein the fluid is a microemulsion.

4. The process of claim 1 wherein the fluid is driven through the field with unthickened water or brine.

5. The process of claim 1 wherein the gas is injected at a rate of 10 to 30 MMCF/day.

6. The process of claim 1 wherein the gas is injected at a pressure in excess of the hydrostatic pressure.

7. The process of claim 1 wherein the formation contains high brine.

8. The process of claim 7 wherein the fluid is a salt-sensitive microemulsion.

9. A process for the chemically enhanced recovery of oil from an oil-bearing formation which consists essentially of the steps of injecting nitrogen, flue gas or exhaust gas into the formation in an amount sufficient to attain trapped gas phase saturation, injecting a fluid containing an effective amount of a microemulsion to displace oil, driving the fluid through the formation, with an aqueous pusher, and recovering the displaced oil.

10. A process for the chemically enhanced recovery of oil from an oil-bearing formation which consists essentially of the steps of injecting nitrogen, flue gas or exhaust gas into the formation in an amount sufficient to attain trapped gas phase saturation, injecting a fluid containing an effective amount of a microemulsion to displace oil, driving the fluid through the formation with an unthickened water or brine, and recovering the displaced oil.

* * * * *